No. 642,113. Patented Jan. 30, 1900.
B. L. HARRIS.
APPARATUS FOR COOKING AND DRYING CEREALS.
(Application filed Nov. 10, 1897.)
(No Model.) 3 Sheets—Sheet 1.
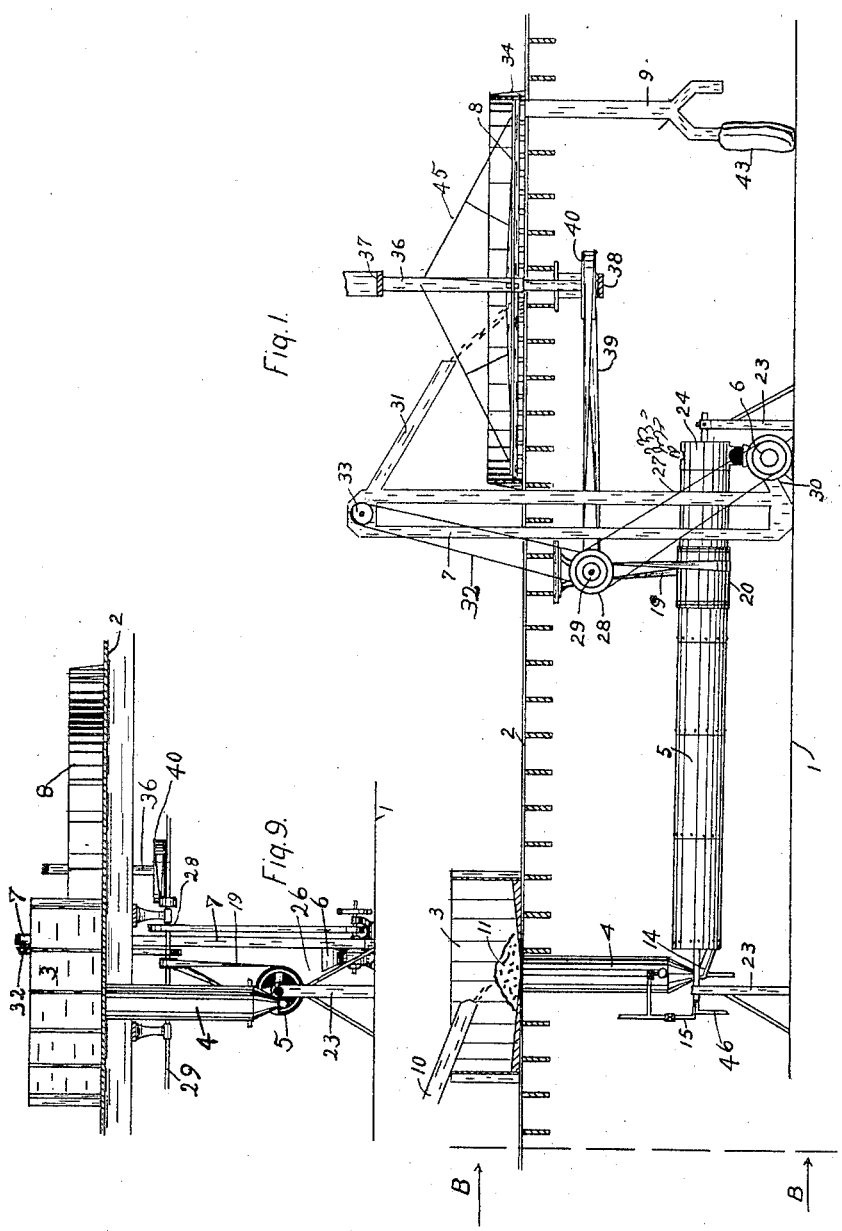
Witnesses
R. O. Hawkins
Jula Green
Inventor
Bradner L. Harris
By V. H. Lockwood
His Attorney.

No. 642,113. Patented Jan. 30, 1900.
B. L. HARRIS.
APPARATUS FOR COOKING AND DRYING CEREALS.
(Application filed Nov. 10, 1897.)
(No Model.) 3 Sheets—Sheet 2.
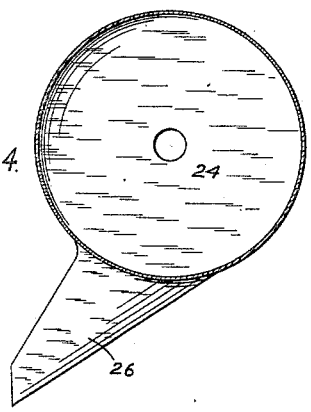
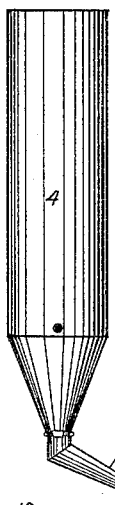
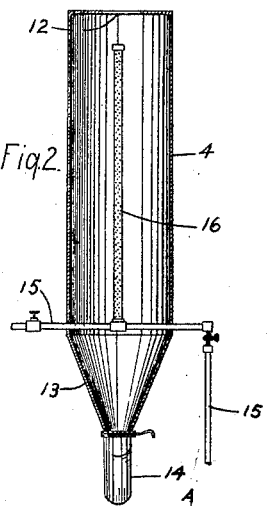
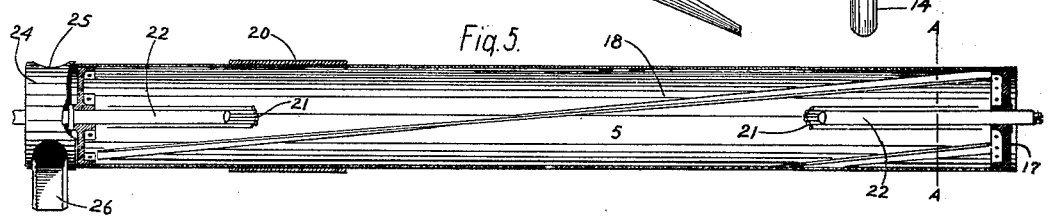
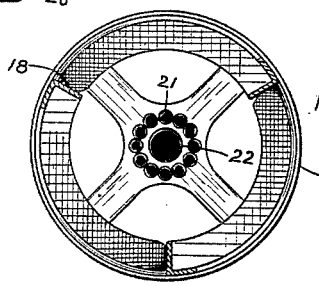
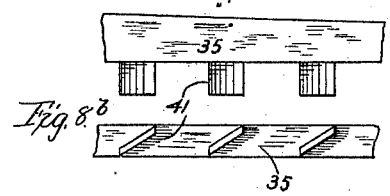
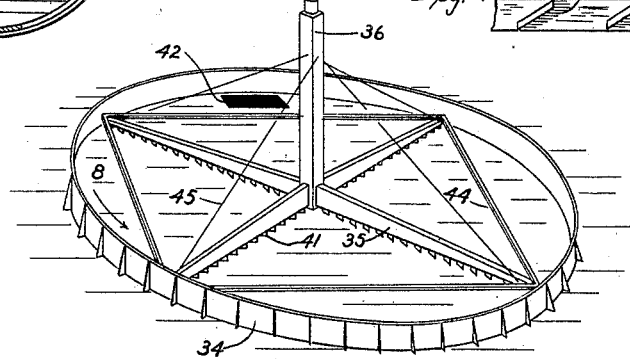
Witnesses
R. O. Hawkins.
Gula Green
Inventor
Bradner L. Harris
By V. H. Lockwood
His Attorney.
THE NORRIS PETERS CO., PHOTO-LITHO., WASHINGTON, D. C.

No. 642,113. Patented Jan. 30, 1900.
B. L. HARRIS.
APPARATUS FOR COOKING AND DRYING CEREALS.
(Application filed Nov. 10, 1897.)
(No Model.) 3 Sheets—Sheet 3.

Witnesses
R. D. Hawkins.
Gula Green

Inventor
Bradner L. Harris
By V. H. Lockwood
His Attorney.

UNITED STATES PATENT OFFICE.

BRADNER L. HARRIS, OF INDIANAPOLIS, INDIANA, ASSIGNOR OF ONE-HALF TO LEON O. BAILEY, OF SAME PLACE.

APPARATUS FOR COOKING AND DRYING CEREALS.

SPECIFICATION forming part of Letters Patent No. 642,113, dated January 30, 1900.

Application filed November 10, 1897. Serial No. 658,668. (No model.)

*To all whom it may concern:*

Be it known that I, BRADNER L. HARRIS, of Indianapolis, county of Marion, and State of Indiana, have invented a certain new and useful Apparatus for Making Cereal Products; and I do hereby declare that the following is a full, clear, and exact description thereof, reference being had to the accompanying drawings, in which like letters and figures refer to like parts.

My invention relates to mechanism for manufacturing cereal products, and especially for making steam-cooked feedstuff.

The full nature of my invention will fully appear from the accompanying drawings and the description and claim following.

Figure 10:
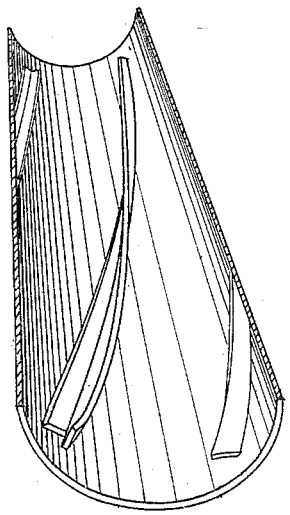
Figure 11:
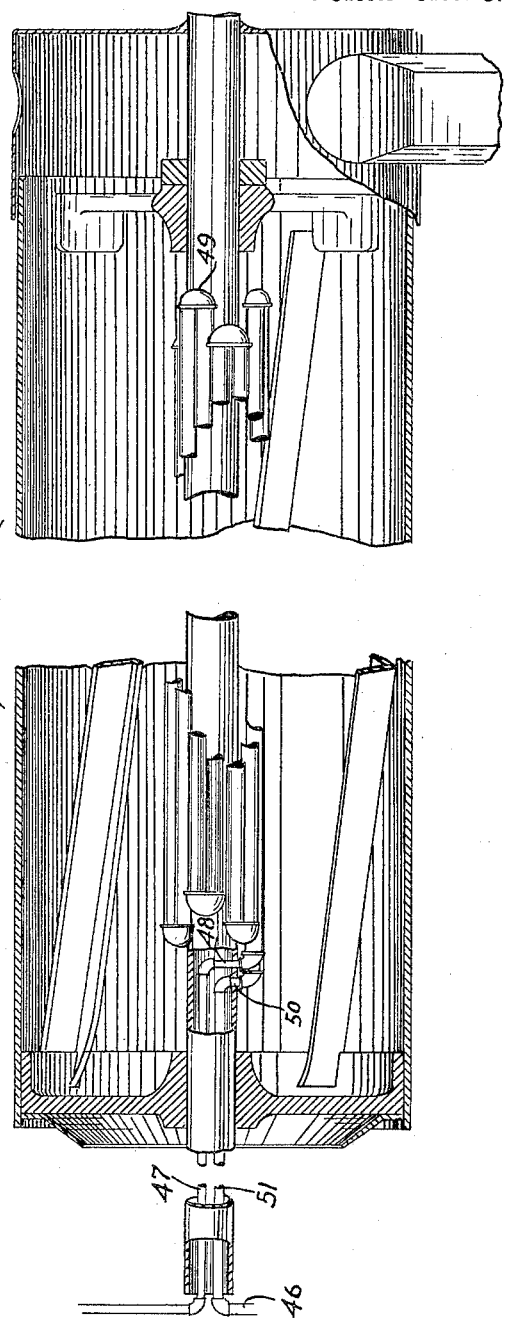

In the drawings, Figure 1 is a side elevation of my mechanism, the floor of the building and some other parts being shown in cross-section. Fig. 2 is a central vertical section of the cooker. Fig. 3 is a side elevation thereof. Fig. 4 is an elevation of the outlet-cylinder of the drier. Fig. 5 is a central longitudinal section of the drier, the axle and heating-pipes being broken away. Fig. 6 is a cross-section of the drier on the line A A of Fig. 5. Fig. 7 is a perspective of the cooler. Fig. 8ª shows a side, and Fig. 8ᵇ a bottom, view of a section of one of the arms of the cooler. Fig. 9 is a section on the line B B of Fig. 1. Fig. 10 is a perspective of a longitudinal section of the drier-cylinder. Fig. 11 is a central longitudinal section of the ends of the drier, the central part being broken away.

I let 1 represent the ground floor of a building, in which my mechanism is set up, and 2 the floor above. On the upper floor I place a hopper 3, below it a cooker 4, connected up with a drier 5, which leads to a grinding-mill 6, from which the material is carried by the elevator or conveyer 7 to the drier or cooler 8 on the upper floor, from which the material passes to the packer 9. These indicate in a general way the machines and combination of machines constituting my mechanism.

In detail the hopper 3 consists of a cylindrical receptacle having a bottom inclined downward to a central outlet into the cooker. The grain is conveyed from the source of supply by any suitable means through the spout 10 into the hopper. 11 represents a pile of grain. In making feedstuff for animals I use a combination of corn, oats, and other cereals.

The cooker, which is shown in Figs. 2 and 3, comprises a cylinder with an inlet-opening 12 to receive the grain from the hopper. At the lower end of the cylinder a cone 13 connects up with the spout 14, through which the material is conveyed to the left-hand end of the drier. The material in the cooker is cooked by steam and enters the perforated steam-pipe 16, that extends up centrally into the cooker. My purpose is to cook the material as thoroughly as possible without consuming too much time.

The material passes from the cooker into the drier, so as to prepare it for grinding. The drier comprises a cylinder so set that its outlet end will be slightly lower than its inlet end. Its pitch should be such as to keep the material in it long enough for it to become dry. At the inlet end of the cylinder an inlet-opening is provided to receive the material from the spout 14 of the cooker. This cylinder is rotated by the belt 19, that surrounds a sleeve 20, that is secured to the cylinder of the drier. Within the cylinder of the drier I secure spirally-arranged ribs 18, extending from one end to the other, as seen in Figs. 5, 6, 10, and 11. These ribs form long pockets that catch up the grain, after it has entered the drier, as the drier is rotated and carry it up until the drier has made about a half-revolution, whereupon the grain by gravity falls out of the pocket or off the ribs 18 onto the radiator-pipes 21 and down into the lower part of the cylinder of the drier. It is then carried up again, and the process continues over and over again until the grain passes out of the drier. The radiator consists of a series of pipes 21, placed about the axle 22, which is a tube supported on the posts 23 at each end. Steam is supplied to the radiator-pipes 21 from the steam-pipe 15 through the pipe 47, that extends into the tubular axle 22 for some distance and is connected with a radiator-pipe 21 by the pipe 48, that passes through the shell of the tubular axle, as seen in Fig. 11. The radiator-pipes are connected into a series by the return-bends 49, and the steam passes from them out through the pipes 50, 51, and 46, arranged in the same manner as the inlet steam-pipes 15, 47, and 48.

At the outlet end of the drier the cylinder turns in an outlet-cap 24, to be seen in Fig. 5 and is shown by an end elevation in Fig. 4. It is secured to the axle 22 and has an opening 25 above to let out the steam and moisture from the drying material, as seen in Fig. 1. It also has an outlet-spout 26, that conveys the material from the drier to the grinding-mill 6.

I do not show the construction of the grinding-mill 6 in detail, as there is nothing new or peculiar about it, its form or construction being such as desired, and it is driven from any suitable source of power. (Not here shown.) I show a belt 27 to drive the pulley 28 and the shaft 29, on which it is mounted and from which the belt 19 is driven. The shaft 29 is supported in a horizontal position by suitable hangers from the floor above. The cooked material after passing through the drier becomes dry, so that the grinding-mill can grind it into fine granular material, every particle being independent and separate from every other particle.

The material leaves the grinding-mill hot and is conveyed by an elevator or conveyer 7, that is connected with the grinding-mill by the spout 30, up and through the spout 31, discharging into the cooler 8. The elevator or conveyer is driven by a belt 32, running from a suitable pulley on the shaft 29 to the pulley 33 in the frame of the conveyer. This frame is held in an upright position by the floor through which it passes. The cooler 8 is essentially a reel operating horizontally within a cylindrical rim or wall on the floor or other suitable bottom. The reel consists of arms 35, radiating from a vertical shaft 36, secured in the frame 37 above so as to rotate therein and extending down through the floor and secured in the frame-piece 38 below. It is rotated by the belt 39, running from a pulley on the shaft 29 over the pulley 40. By this means the cooler or reel is rotated on the floor. The grain is dumped on the floor within the rim or wall 34, preferably near the center. The arms 35 are so mounted as to extend a few inches above the floor and have depending from them a series of flanges or flights 41, set at an angle to such arms. By this construction the flanges or flights 41 mix and sweep the material on the bottom or floor beneath, thus stirring it and thinning it so it will rapidly cool, and at the same time they gradually push the material toward the rim or wall. This is accomplished by the angular position of the flights or flanges. When the material reaches the rim or wall, it is swept by the reel down into the outlet-opening 42 into the packer-pipe 9, from which it enters a bag or other suitable receptacle 43. The arms are braced horizontally by the tie-bars 44 and vertically by the tie-rods 45.

What I claim as my invention, and desire to secure by Letters Patent, is—

In a drier for cereal products having a rotary cylinder, a tubular axle on which the cylinder is mounted, a series of radiator-pipes secured about the tubular axle connected by return-bends, a steam-inlet pipe extending into the tubular axle and then through its shell and connected with a radiator-pipe, and an outlet-pipe extending from the radiator through the shell of the tubular axle and then out of such axle, substantially as set forth.

In witness whereof I have hereunto set my hand this 15th day of September, 1897.

BRADNER L. HARRIS.

Witnesses:
V. H. LOCKWOOD,
ZULA GREEN.